Patented Oct. 17, 1939

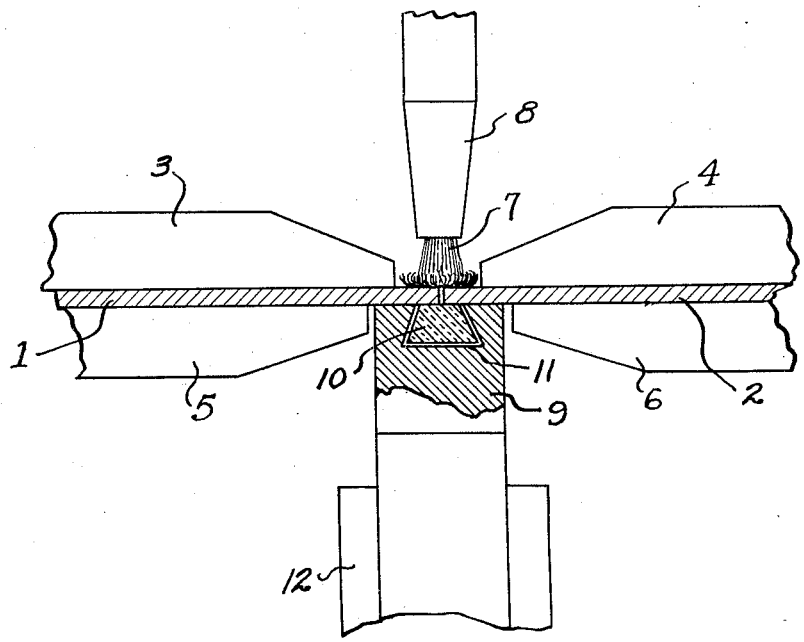

2,176,602

UNITED STATES PATENT OFFICE

2,176,602

PROCESS FOR PREPARING IRON OR STEEL SHEETS SUCH AS SILICON STEEL SHEETS FOR MAGNETIC USES

Wesley J. Beck and Alva E. Taylor, Middletown, Ohio, assignors to The American Rolling Mill Company, Middletown, Ohio, a corporation of Ohio Application February 2, 1933, Serial No. 654,900
Renewed November 15, 1937

10 Claims. (Cl. 78—92)

This is a continuation in part of our application Serial No. 474,656 filed August 11, 1930.

Our invention relates to processes for preparing the iron or steel or alloy sheets for use, by welding the ends of sheets to each other in such a way that strips of sheet width of this ferrous metal can be sold in coils or long lengths, and later slit to desired widths, and passed through punch presses for cutting out parts of laminated cores and the like for electrical instruments and parts.

There has been considerable effort directed to the forming of continuous strips of silicon steel for use in punch presses, although it has thus far been found impractical to manufacture the high silicon steel in lengths which will be economical to use in punch presses, and to properly cold roll such lengths to give the required surface conditions. Silicon steel is brittle to a degree when cold, is more ductile under a slight rise of temperature, and has a scale that is difficult to deal with. Moreover, silicon steel oxidizes readily, one constituent thereof, upon oxidizing, producing an inert material, namely silicon dioxide, which tends to prevent a welding action.

Silicon steel sheets for laminated core work are in addition quite thin in cross-section, running as they do ordinarily between 24 and 30 gauge. Thus, while commercially the sheets are produced in short lengths, making the desirability of welding them into lengths for punch press operations obvious, it is not an easy problem to provide a means for welding due to the above characteristics, particularly where a butt weld is attempted. Indeed, we know of no case prior to our work in which a satisfactory butt weld has been produced. Commercial attempts at welding have hitherto produced only lap welds which, while punch press operation may be somewhat facilitated, does not eliminate wastage, or if lap-welded sections are employed in transformer cores or the like, produce cores of less efficiency, and lower space factor.

It is an object of our invention to produce silicon steel in strip form in which the individual pieces are joined by butt welds. The welds must be flexible, so that the strip may be coiled for shipment and handling in the slitters, and in the punch presses. The welds must be strong and capable of withstanding repeated strains.

These alloys are readily oxidizable, and a method of welding would suggest itself which departed from oxidizing conditions. It is found, however, that the ordinary electric arc or resistance welding under reducing conditions or under atmospheric conditions, will not be satisfactory.

To resort to gas welding would at first consideration appear to be impractical. The metal is so thin that an attempt to fuse the edges together in a butt weld, which most be smooth, flat, and of the same thickness as the sheet itself, would appear to require so much heat that the metal itself would flow away from the butt line thus leaving holes in the final product. The metal is so thin that it will require some kind of a support for the butted edges, where a butt weld is attempted, and the use of an ordinary support, such as a "backing bar" will conduct away so much heat from so thin a product that a welding temperature would seem to be impractical, except with the attendant danger of puncturing the product at the weld line.

After a great deal of experiment, however, we have discovered that standard silicon steel sheets of considerable width (regular rolling mill widths for sheet metal being well within the range) can be welded by a gas, and that the weld, though formed of silicon steel (the base metal), will be flexible enough to submit to the required bending for coiling, decoiling and the like; and will in addition be strong and permanent, without any breaks along the weld line.

We have been able commercially to produce butt welds having these desirable characteristics in thin silicon steel sheet material by that series of process steps of which we shall now describe an exemplary embodiment. Reference is made to the accompanying drawing which shows in somewhat diagrammatic form a set of conditions, such as is contemplated by our invention, surrounding the weld as it is being formed. It will be understood that we are not restricted specifically to the showing of this drawing.

We find that in welding silicon steel sheets end to end, by a butt weld, we do not gain any advantage by the use of a flux or solder. To gain a clean edge for the weld, we merely shear the product and neglect the presence of such scale as may be present along the faces adjacent to the cut edges.

We find also that it is absolutely necessary to have parallel edges that can be butted together at all points, and that prior to welding, the edges must be butted and held closely in to complete contact. Any departure from this will result in a punctured product.

In the next place, it is necessary to exclude oxygen from the weld as it is being formed, on the side of the sheets opposite the side being treated by the welding flame. This may be done in a number of ways as by means of a non-oxidizing gas, but we prefer to employ for this purpose, means which support the metal sheets below the butted joint, by which we mean a member which is continuous across the line of weld, and is coplanar with the sheets. This is to be distinguished from merely supporting the sheets adjacent the butted joint, which also is desirable. Means to support the actual edges of the sheet below the butted joint are quite desirable since such means not only exclude oxygen from the weld, but also tend to prevent the blowing of holes in the weld. Again, such support helps to prevent the buckling of the edges adjacent the line of weld.

A conductive metal support would, however, prevent the development of sufficient heat for the weld. We therefore provide as a support some material less conductive of heat, such as a piece of carbon, or we raise the temperature of the backing bar to a point approaching the temperature of the weld, as hereinafter set forth.

Our best results have been attained with an oxyactylene torch. This must be arranged to give a neutral flame, since an oxidizing flame will oxidize the metal, and a reducing flame will not give sufficient heat to melt it. When the sheet edges have been trimmed square and placed in close and complete abutment, the oxy-acetylene torch with neutral flame is passed quite rapidly across the butt joint.

Since the metal is thin and the flame very hot, there is a tendency of the sheets to buckle even during the rapid passage of the welding flame across the joint. In order to overcome this, we find it best to hold the sheets down by members lying across them and very close to the joint itself.

If the weld is formed as above noted, while the pieces are warm, the strip as it is formed is passed between rolls, which will flatten and roll out any excessive metal at the joint. This rolling is not a necessity, but it is quite desirable. It cannot be done while the metal is cold, however, and unless the rolling is done while the heat from welding is still in the metal, the strip will have to be heated up somewhat before rolling.

Proceeding in the manner above outlined, we have produced with very great saving to the manufacturers of electrical apparatus, strips of silicon steel of indeterminate length, made from the ordinary steel mill widths of silicon steel sheets in gauges required for laminations of electrical apparatus. Our weld is formed without any appreciable variation in electrical properties of the pieces welded; and subsequent heat treatments will not destroy the weld, which, while it appears to be somewhat more flexible than the metal itself, does not give way under heat, and is as tough as or tougher under bending strain than the metal. Pieces for electrical apparatus can be stamped or punched out so as to include the welded joint in the stampings without any appreciable deterioration in the electrical properties of the stamping or punching. As can readily be appreciated, this saves for the manufacturer quite a large portion of what has formerly been waste from the stamping operation.

In the drawing we have indicated an exemplary apparatus with which our process may be practiced. We have shown the sheets 1 and 2, with sheared edges held in exact abutting relationship by upper clamping jaws 3 and 4, and lower clamping jaws 5 and 6, a pair of said jaws being located on either side and adjacent the butted edges. The sheets are supported beneath the butted joint by a backing bar indicated generally at 9. This may be of a substance of low heat conductivity; but if made of metal, we prefer to provide it with an inset heating bar 10 of electrically resisting alloy, set in an insulating substance 11. Electric current may be employed to raise the temperature of the bar 10. We are not restricted to this construction, however since metallic backing bars otherwise heated may be employed. It will be noticed that the top of the backing bar 9, and of the heating bar 10, form a plane surface which supports the sheets beneath the actual edges thereof and below the butted joint. It is preferable to press the backing bar up into tight contact with the sheet edges, for which purpose, in one embodiment of our invention, we mount the backing bar slidably in a member 12, and advance it against the sheet edges under pressure. Preferably the upper clamp members 3 and 4 extend slightly over the edges of the backing bar as shown. The function of the backing bar in excluding oxygen from the weld on the side opposite the flame will be clear. The welding is done by means of a flame 7 from the torch 8.

While we have devoted our attention chiefly to the welding of silicon steel sheets, in which special problems are involved, we find that we can weld in the same manner other alloys of iron, such as alloys high in nickel content or plain steel sheets where the butt joint is desirable as for punch press work, and the metal is quite thin and likely to run under the weld.

Having thus described our invention, what we claim as new and desire to secure by Letters Patent, is:

1. That process of butt welding silicon steel sheets, which consists in cutting the edges to exact parallelism, clamping the edges into complete abutting contact throughout the joint to be welded, supporting the actual edges of the sheets beneath the butted joint, and welding the metal of the sheets together by means of a neutral gas flame, while excluding oxygen from the weld upon the side opposite the flame.

2. That process of butt welding silicon steel sheets, which consists in cutting the edges to exact parallelism, holding the edges in complete abutting contact throughout the joint to be welded, and welding the metal of the sheets together by means of a neutral gas flame, the actual edges being supported during the welding upon the side away from said flame by a poorly conducting planar surface as a backing plate, said plate extending across the joint and closely adjacent thereto to exclude oxygen therefrom.

3. That process of butt welding silicon steel sheets, which consists in cutting the edges to exact parallelism, holding the edges in complete abutting contact throughout the joint to be welded, and welding the metal of the sheets together by means of a neutral gas flame, the actual edges being supported during the welding by substantially uniplanar means on the opposite side of said flame, extending across the joint and closely adjacent thereto to exclude oxygen therefrom, the ends of said sheets being held down against buckling along lines closely adjacent to the butt joint.

4. That process of butt welding silicon steel sheets, which consists in cutting the edges to exact parallelism, holding the edges in complete abutting contact throughout the joint to be welded, and welding the metal of the sheets together by means of a neutral gas flame, the actual edges being supported during the welding by a surface adapted to be raised, without substantial deterioration, to a temperature approaching that of the welded metal, said surface being disposed on the side away from said flame, and being continuous across the joint and co-planar with the sheet edges so as to exclude oxygen from the line of weld.

5. That process of butt welding silicon steel sheets, which consists in cutting the edges to exact parallelism, holding the edges in complete abutting and co-planar contact throughout the joint to be welded, and welding the metal of the sheets together by means of a neutral gas flame, the actual edges being supported during the welding by a surface on the side away from said flame extending across the joint in co-planar relation to the sheet edges and closely adjacent thereto to exclude oxygen therefrom and adapted to be raised, without substantial deterioration, to a temperature approaching that of the welded metal, and rolling the metal at the welded joint while maintaining the heat of the weld.

6. That process of butt welding silicon steel sheets, which consists in cutting the edges to exact parallelism, holding the edges in complete abutting contact throughout the joint to be welded, and welding the metal of the sheets together by means of a neutral gas flame, the actual edges being supported during the welding upon a carbon backing plate, disposed on the side away from said flame, being continuous and co-planar across said joint and adapted to exclude oxygen from said weld, and rolling the welded joint while maintaining the heat of the weld.

7. That process of butt welding thin silicon steel sheets which comprises cutting the edges of sheets to exact parallelism, holding the edges in complete abutting and co-planar contact throughout the joint to be welded and welding said sheet edges together by a neutral flame which protects the weld from oxidation upon one side, supporting the actual edges of the sheets by means on the other side of said weld in the nature of a backing bar having a surface extending across and in co-planar relationship to said edges upon the side opposite to said flame, whereby oxygen is excluded from the weld, and heating said means to a temperature approaching that of the weld.

8. That process of butt welding thin silicon steel sheets to make a continuous band thereof, which comprises cutting the edges of said sheets to exact parallelism, clamping said sheets in co-planar relationship with their edges abutting, supporting said sheets to prevent buckling of said edges, welding said edges together by a neutral flame which excludes oxygen from said weld upon one side, and simultaneously excluding oxygen from said weld upon the other side.

9. That process of joining thin silicon steel sheets end to end so as to make completely usable strip stock of indefinite length for punching, stamping and the like, the joining being accomplished by butt welding while the edges of successive sheets are held parallel and in butted relationship, which comprises bringing a smooth, flat backing member against the butted edges and marginal portions of the sheets upon one side of said butted sheets so as both to support the metal at the line of weld and to protect the metal upon said one side from oxidation, making a weld by applying a neutral gas flame to said edges on the other side of said butted sheets, and during said welding, raising the temperature of said backing member to a temperature approaching that of the weld.

10. That process of joining thin silicon steel sheets end to end so as to make completely usable strip stock of indefinite length for punching, stamping and the like, the joining being accomplished by butt welding while the edges of successive sheets are held parallel and in butted relationship, which comprises bringing a smooth, flat backing member against the butted edges and marginal portions of the sheets upon one side of said butted sheets so as both to support the metal at the line of weld and to protect the metal upon said one side from oxidation, making a weld by applying a neutral gas flame to said edges on the other side of said butted sheets, and during said welding, raising the temperature of said backing member to a temperature approaching that of the weld by applying electric current to said backing member to raise the temperature thereof.

WESLEY J. BECK.
ALVA E. TAYLOR.